(12) United States Patent
Yuzawa

(10) Patent No.: US 6,726,950 B2
(45) Date of Patent: Apr. 27, 2004

(54) METHOD FOR PRODUCING A COFFEE BEVERAGE

(76) Inventor: Tadashi Yuzawa, 3-5-19 Otowa, Ichinomiya-shi, Aichi (JP), 491-0045

( * ) Notice: Subject to any disclaimer, the term of this patent is extended or adjusted under 35 U.S.C. 154(b) by 0 days.

(21) Appl. No.: 10/330,112

(22) Filed: Dec. 30, 2002

(65) Prior Publication Data

US 2004/0052917 A1 Mar. 18, 2004

(30) Foreign Application Priority Data

Sep. 12, 2002 (JP) ........................................ 2002-267123

(51) Int. Cl.[7] ................................................. A23F 5/00
(52) U.S. Cl. ...................................... 426/569; 426/594
(58) Field of Search ................................. 426/594, 569

(56) References Cited

U.S. PATENT DOCUMENTS

| | | | |
|---|---|---|---|
| 4,800,805 A | * | 1/1989 | Mahlich et al. |
| 5,207,148 A | | 5/1993 | Anderson et al. |
| 5,912,039 A | * | 6/1999 | Browne |
| 6,019,032 A | | 2/2000 | Arksey |
| 6,183,800 B1 | | 2/2001 | Von Straten et al. |

\* cited by examiner

*Primary Examiner*—Anthony Weier
(74) *Attorney, Agent, or Firm*—Rader, Fishman & Grauer PLLC

(57) ABSTRACT

A method for producing a coffee beverage with mildness and robustness without ruining lustrous color and aroma of brewed coffee. The method includes a coffee liquid preparation step of brewing coffee or preparing a coffee liquid using cold or hot water and at least one of coffee beans ground up into appropriate grain size, a coffee concentrate and a coffee powder, and pouring the coffee liquid into a container, a frothing liquid base preparation step of mixing a skim-milk powder and cold or hot water to obtain a frothing liquid base, a frothing step of conducting a frothing process on the liquid base to form a froth layer on a surface of the liquid base, and a mixing step of mixing froth of the froth layer with a supernatant liquid or froth of the coffee liquid to make the froth of the froth layer take on a consistent brown color.

16 Claims, 5 Drawing Sheets

METHOD FOR PRODUCING A COFFEE BEVERAGE

BACKGROUND OF THE INVENTION

1. Field of the Invention

The present invention relates to a method for producing a coffee beverage, and more particularly a method for producing a coffee beverage by which brewed coffee may be given robustness and mildness to be easy to drink without losing the beauty of its appearance.

2. Description of Related Art

Various methods for brewing coffee are known, such as a drip method, a siphon method, an espresso method and a water drip method, under which raw beans are used after being roasted and ground up till they have appropriate graininess, and a method under which a commercially available instant coffee powder or coffee concentrate is dissolved in cold or hot water. When any of these methods is tried, obviously, brewed coffee is dark brown in color without turbidity.

Brewed coffee may be served in various ways; it may be varied based on whether to have it black with no sugar or to add cream and/or sugar optionally, whether it is brewed strongly or weakly, or any other conditions. In particular, espresso coffee brewed in the espresso method is known as strong coffee. The reason why espresso coffee is strong is as follows: coffee beans are roasted and ground into a fine powder, and pressure is applied to the powder to brew coffee instantaneously, thereby forming brown fine froth covering the surface of the brewed coffee when it is poured into a coffee cup. Such coffee tastes much stronger than strongly dripped coffee does, and gives off more of its own flavor.

In general, coffee brewed on the normal or weak side, which is easy to drink, is preferred, and whether to have it black or creamed/sweetened tends to depend on how each individual likes. Strongly dripped black coffee or espresso coffee offers pleasure from a savor and aroma intrinsic in coffee, but because of being strong and bitter, it is rather hard to drink, and thus there is a tendency among many people not to prefer such coffee. Therefore, with a growing trend to pursue gourmet in recent years, there have been offered a wider range of coffee beverage variations provided by making authentic coffee mild and easier to drink.

Well-known examples of such coffee are café au lait, which is so-called white coffee, café latte prepared by pouring espresso coffee into milk simultaneously frothed and warmed by a steamer, cappuccino prepared by putting warmed and well-frothed milk on strongly dripped coffee or espresso, and the like.

Specifically, as for the technique for lessening bitterness and adding mildness to coffee by using a milk ingredient, Patent Literature 1, which will be listed below, discloses café latte and cappuccino which are espresso beverages containing steamed milk. As shown in FIG. 4, café latte and cappuccino according to the Patent Literature 1 are obtained by pouring coffee supplied from a line 52 and frothed milk supplied from a milk tube 100 simultaneously into a serving cup 54. It should be noted that the coffee supplied from the line 52 is the so-called espresso coffee prepared by blending a coffee fine powder and high-temperature water under pressure in a brewer assembly 22 and then extracting only a liquid therefrom, and that the frothed milk supplied from the milk tube 100 is prepared by mixing a programmed mixture of air, steam and milk with froth.

In addition, Patent Literature 2 discloses a technique by which a milk concentrate or a coffee concentrate is mixed with water using a venturi chamber, which flows together to a whirl chamber, and is beaten in the whirl chamber to form frothed milk or café creme. Further, Patent Literature 3 discloses, as shown in FIG. 5, a technique by which coffee ground using a brewer assembly 14 is processed to prepare an espresso liquid, and a measure of the espresso liquid is delivered together with steamed and/or frothed milk to a cup 21 to provide café latte or cappuccino.

[Patent Literature 1]
  U.S. Pat. No. 5,207,148
[Patent Literature 2]
  U.S. Pat. No. 6,183,800
[Patent Literature 3]
  U.S. Pat. No. 6,019,032

Conventionally, however, there are some problems in making a coffee beverage in the above-mentioned cases. When cream is added to brewed coffee, or when coffee and a milk ingredient are mixed in advance to prepare café au lait, café latte or cappuccino, "unturbid dark brown colors" inherent in a coffee liquid becomes whitish, and the appearance of the coffee is thereby damaged. Besides, adding cream or a milk ingredient can add mildness and robustness to the inherent taste of the coffee liquid, whereas the coffee comes to smell too milky, which deteriorates its aroma.

As described above, none of the conventional methods is capable of producing an easy-to-drink coffee beverage obtained by giving mildness and robustness to a coffee liquid without destroying the color, luster and aroma of its own, because even a slight amount of cream or milk would cloud the coffee liquid and thereby destroy its appearance.

The present inventor has researched and studied strenuously by trial and error to find a method for producing a coffee beverage by which mildness and robustness may be given to a coffee liquid without destroying the color (unturbid dark brown color) and aroma that are original to the coffee liquid. During the research, a variety of dairy products were compared and examined, including "dry whole milk" made by powdering milk, "powdered formula", made by conditioning proteins and fats in milk to be small enough to be easily absorbed by babies and blending necessary nutrients without excess or shortage, "Creap" (registered trademark), one of the instant cream powder products in Japan, which is predominantly composed of cream to which skim milk and the like are added, "skim-milk powder" made by removing cream components from milk and powdering it, which has almost no milk fat and is rich in calcium and proteins. As a result of the comparison, it was found that the skim-milk powder was made by removing cream components from milk.

After a continued study and research based on such a finding, it was further found that, if a skim-milk powder dissolved in cold or hot water is frothed, and only a layer of the froth is mixed with a supernatant fluid or froth of freshly brewed coffee, mildness and robustness may be given to the brewed coffee to provide a coffee beverage without destroying the color, luster and aroma that the coffee originally has. In other words, it was found that, if a supernatant fluid or froth of freshly brewed coffee is mixed with froth made by frothing a skim-milk powder with water, the skim-milk powder froth changes into creamy fine froth having a light, lustrous brown (maroon) color, as if it absorbed only the color components of the brewed coffee, without clouding "unturbid dark brown color" that the brewed coffee originally has. In addition, it was also found that the skim-milk powder froth adds mildness and robustness to the taste of the brewed coffee while eliminating a milky smell.

SUMMARY OF THE INVENTION

The present invention has been made in view of the above circumstances and has an object to overcome the above problems and to provide a method for producing a coffee beverage by which mildness and robustness may be added without destroying the color, luster and aroma intrinsic in freshly brewed coffee. Thus, the present invention may provide a breakthrough production method intended to make a coffee beverage easy to drink while bringing out the intrinsic taste of authentic coffee of various brands to advantage through a quick and easy approach.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, a method for producing a coffee beverage comprises a coffee liquid preparation step of brewing coffee or preparing a coffee liquid using cold or hot water and at least one of coffee beans ground up into appropriate grain size, a coffee concentrate and a coffee powder, and pouring the coffee liquid into a container, a frothing liquid base preparation step of mixing a skim-milk powder and cold or hot water to obtain a frothing liquid base, a frothing step of conducting, a frothing process on the frothing liquid base to form a froth layer on a surface of the liquid base and a mixing step of mixing froth of the froth layer with a supernatant liquid or froth of the coffee liquid to make the froth of the froth layer take on a consistent brown color.

According to the method for producing the coffee beverage consistent with the present invention, a skim-milk powder and water are blended, and a frothing process is then performed to form a froth layer on the surface of the mixture, so that the froth of that layer is mixed with a supernatant fluid or froth of brewed coffee so that the froth may take on a consistent brown color, thereby producing a coffee beverage with mildness and robustness without ruining the lustrous color and aroma of the brewed coffee. In addition, according to the method for producing the coffee beverage consistent with the present invention, bitter, hard-to-drink coffee may be made a suave, easy-to-drink coffee beverage through a quick and easy approach.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
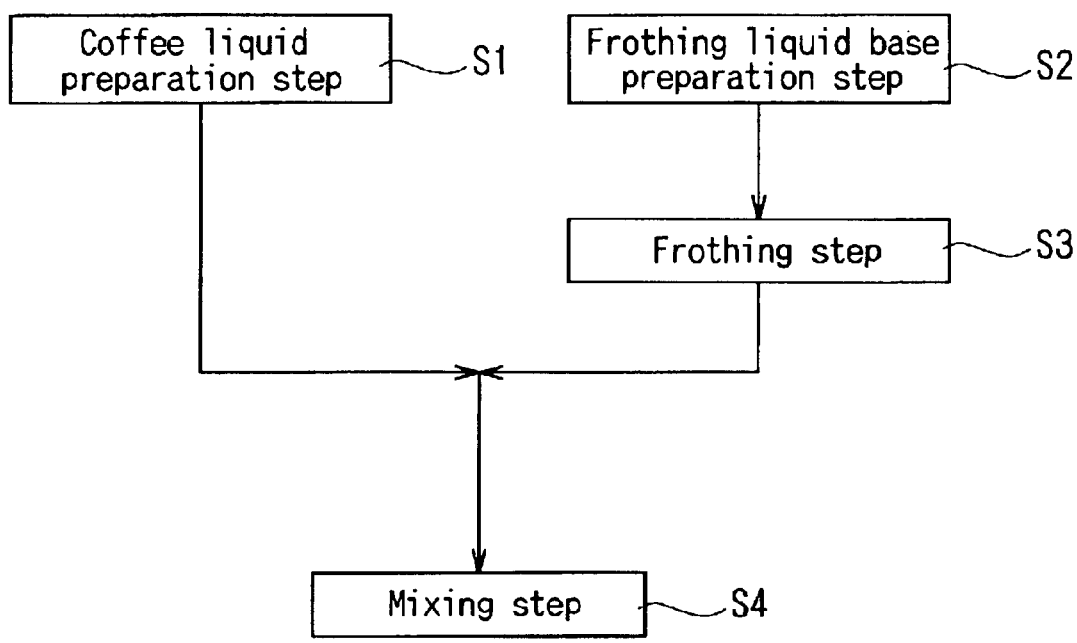
FIG. 1 is a view showing a production process included in a method for producing a coffee beverage consistent with one preferred embodiment of the present invention.

A detailed description of one preferred embodiment of a method for producing a coffee beverage embodying the present invention will now be given referring to the accompanying drawings. As shown in FIG. 1, a method for producing a coffee beverage comprises a coffee liquid preparation step S1 of brewing coffee or preparing a coffee liquid using cold or hot water and at least one of coffee beans ground up into appropriate grain size, a coffee concentrate and a coffee powder, and pouring the coffee liquid into a container, a frothing liquid base preparation step S2 of mixing a skim-milk powder and cold or hot water to obtain a frothing liquid base, a frothing step S3 of conducting a frothing process on the frothing liquid base to form a froth layer on a surface of the fluid base and a mixing step S4 of mixing froth of the froth layer with a supernatant liquid or froth of the coffee liquid to make the froth of the froth layer take on a consistent brown color.

Figure 2:
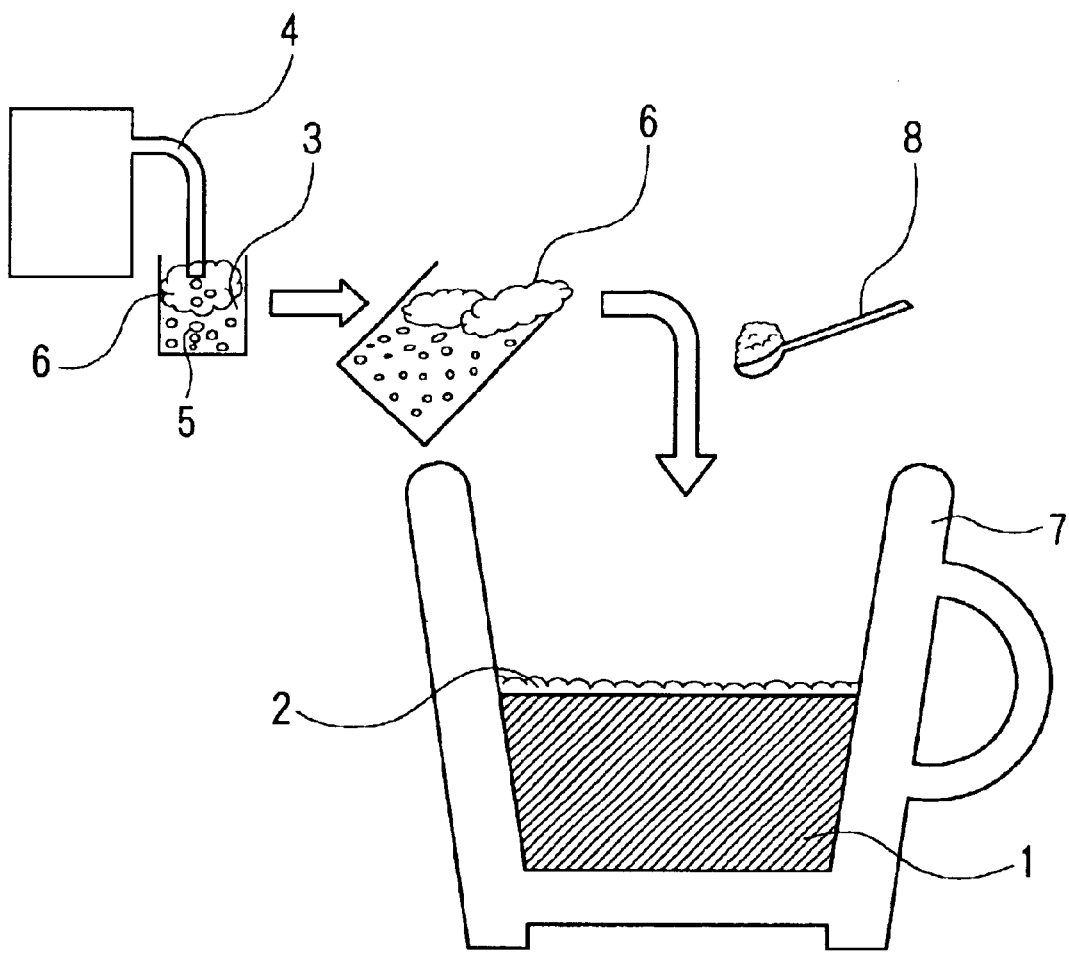
FIG. 2 is a view showing the method for producing the coffee beverage consistent with the preferred embodiment of the present invention.

First, in the coffee liquid preparation step S1, as shown in FIG. 2, a coffee liquid 1 which can be used in the preferred embodiment may be any type of coffee as long as coffee is brewed or the coffee liquid is prepared using at least any one of coffee beans ground up into an appropriate grain size, a coffee concentrate and a coffee powder, together with cold or hot water. Such coffee may include black coffee, espresso coffee, mild coffee, instant coffee or the like. That is to say, the coffee liquid (brewed coffee) may take on a variety according to the preferences of a person who drinks it, and is not limited to any particular type. Nevertheless, as for its appearance, it is preferred that it should come with brown froth 2 floating on its supernatant fluid, which is particularly suitable as the coffee liquid used in the embodiment. There are no particular limitations on the temperature for brewing coffee or preparing a coffee liquid; the temperature may depend on the preferences of a drinker, but may be 50 to 100 degrees centigrade, preferably.

In the frothing liquid base preparation step S2, a skim-milk powder and water are blended at a ratio of 250 g to 1100–1500 cc to obtain a frothing liquid base 3. The ratio of the water to be blended should be within this range. This is because, if the ratio of water was 1000 cc or less to 250 g, a froth obtained by a subsequent frothing process would not be smooth with its appearance being unnatural, and if the ratio of the water to the skim-milk powder was 1600 cc or more to 250 g, the froth obtained would be too soft and smoother than necessary. However, this ratio is merely one example, and the blending ratio may be changed as appropriate in accordance with frothing conditions (which will be described later), water quality and the like.

It should be noted that the frothing liquid base should not be made from any dairy product containing a cream component derived from milk (i.e. content of milk fat), such as dry whole milk, powdered formula, Creap (registered trademark), milk or the like. The reasons for this are as follows. First, the froth obtained by beating any of those dairy products would be unstable and disappear in a short time, and its appearance would not be so good due to its coarse texture. Secondly, the coffee liquid would be clouded by the froth formed by beating any of those dairy products and mixed with a supernatant fluid or froth of the brewed coffee. Thirdly, those products would add a milky taste because of containing milk components. The present invention is intended to make brewed coffee suave enough to be found easy to drink without destroying the flavor of its own, and it is therefore necessary to eliminate the taste of milk components.

The frothing process is a process of applying aeration to the frothing liquid base 3. For this process, a steam nozzle 4 of a commercially available espresso coffee maker may be inserted into the frothing liquid base 3, and a high-temperature and high-pressure steam 5 (steam pressure: 1 atmospheric pressure, steam temperature: 100 degrees centigrade) ejected from the steam nozzle 4 may be delivered with air into the frothing liquid base 3. Thus, the frothing liquid base 3, of which temperature is initially low (e.g. 0 to 10 degrees centigrade), may be frothed while being heated to high temperatures (e.g. 80 to 100 degrees centigrade). This frothing process increases the amount of water contained in the frothing base liquid 3 to some extent. Accordingly, in anticipation of such increase in the water content, the frothing liquid base 3 may be a mixture of a skim-milk powder and water at a ratio of 250 g to 1100–1500 cc.

Incidentally, the frothing process is not limited to the above-described methods, but may be changed in pressure and/or temperature as appropriate. Instead of the steam nozzle, another commercially available tool, such as a whip, a juicer or a mixer, may be used in the same process.

In the mixing step S4, froth 6 of a froth layer formed through the frothing process is mixed with the supernatant fluid or froth 2 of the coffee liquid so that the resultant froth may have a uniform brown color. The mixing ratio is not particularly limited, but preferably, one approximately heaping coffee spoon 8 of the froth 6 may be mixed with the supernatant fluid or froth 2 of the coffee liquid in a demitasse 7a. It is desired that the froth 6 of the froth layer should be mixed not immediately after the frothing process has been completed, but after the froth has come to make almost no change in shape and the form of the froth layer has stabilized. If so, the shape, size and luster of the resultant froth are not affected both before and after the froth 6 is mixed with the supernatant fluid or froth 2 of the coffee liquid.

Figure 3:
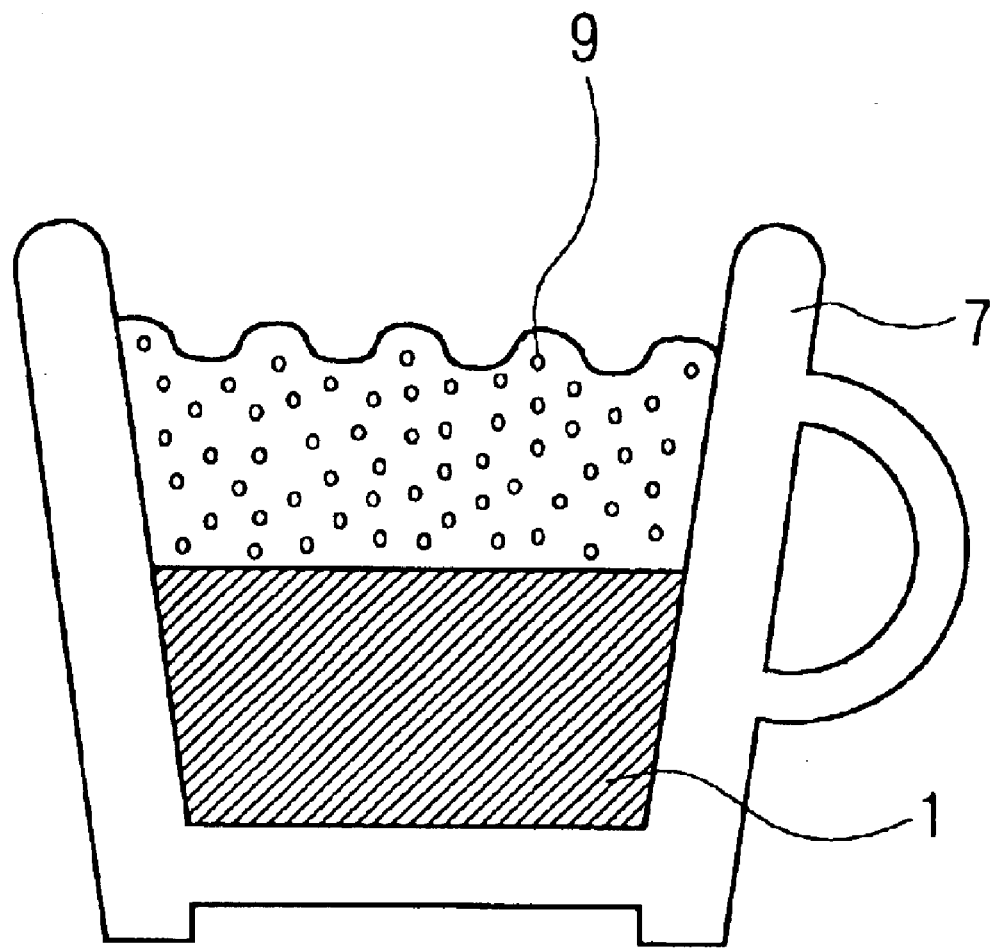
FIG. 3 is a cross-sectional view of a demitasse of a coffee beverage produced by the method for producing the coffee beverage consistent with the preferred embodiment of the present invention.
Figure 4:
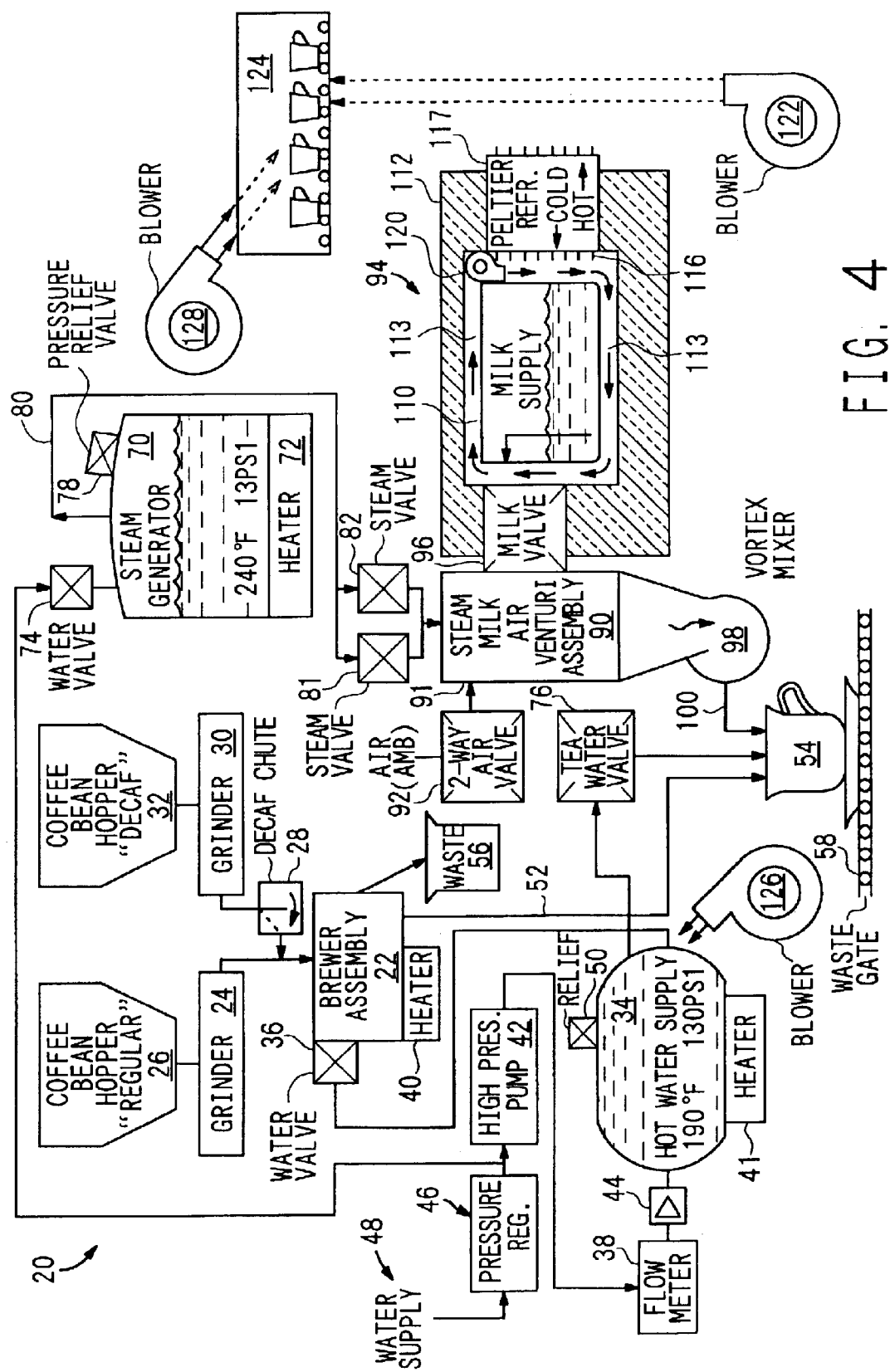
FIG. 4 is a view showing a prior art.
Figure 5:
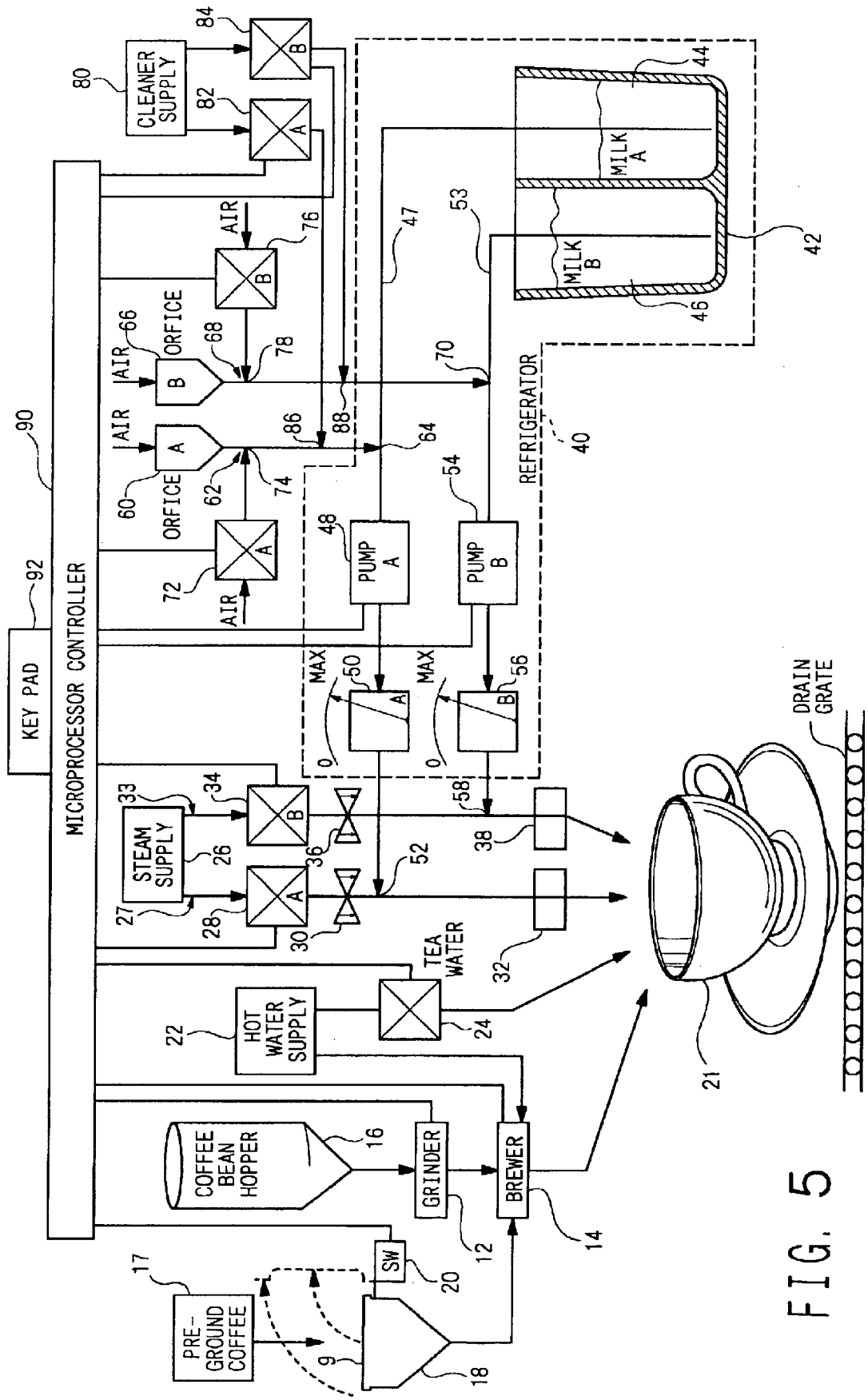
FIG. 5 is a view showing another prior art.

As shown in FIG. 3, through such a mixing process, froth 9 resulting from the mixture becomes fine-grained froth of a light brown (maroon) color and closely packed down to the surface of the coffee liquid. This fine froth does not disappear with its shape intact until the brewed coffee is drunk up, and remains on the bottom of a coffee cup. Further, the fine froth has an excellent flavor itself.

It should be noted that the frothing liquid base 3 obtained in the frothing liquid base preparation step S2 may repeatedly be used any number of times even after it has once been used for the frothing step S3, as long as any froth layer suitable to be mixed with the coffee liquid 1 is formed.

EXAMPLES

Hereinafter, the examples of the present invention will be described referring to Tables 1 to 3. Tables 1 and 2 show compositions of coffee liquids and froth layers, evaluation results and the like according to the examples and comparative examples. Table 3 is a list of the manufacturers and trade names of the ingredients and tool used in those examples and comparative examples.

TABLE 1

|  | Example 1 | Example 2 | Example 3 | Example 4 | Example 5 | Example 6 |
|---|---|---|---|---|---|---|
| Coffee brewing ratio |  |  |  |  |  |  |
| Coffee beans | 10 g | 10 g | 10 g | 10 g | 10 g | 10 g |
| Hot/cold water | 50 cc | 50 cc | 50 cc | 50 cc | 50 cc | 100 cc |
| The amount of use | 50 cc | 50 cc | 50 cc | 50 cc | 50 cc | 50 cc |
| Composition amount for the frothing liquid base |  |  |  |  |  |  |
| Skim-milk powder | 250 g | 250 g | 250 g | 250 g | 250 g | 250 g |
| Dry whole milk | — | — | — | — | — | — |
| Powdered formula | — | — | — | — | — | — |
| Creap | — | — | — | — | — | — |
| Fresh cream | — | — | — | — | — | — |
| Meringue | — | — | — | — | — | — |
| Baking soda | — | — | — | — | — | — |
| Tap water | 1100 cc | 1200 cc | 1300 cc | 1400 cc | 1500 cc | 1100 cc |
| The amount of use | 1 heaping teaspoon | 1 heaping teaspoon | 1 heaping teaspoon | 1 heaping teaspoon | 1 heaping teaspoon | 1 heaping teaspoon |
| Evaluation results |  |  |  |  |  |  |
| Intrinsic color of coffee | Not clouded (◎) | Not clouded (◎) | Not clouded (◎) | Not clouded (◎) | Not clouded (◎) | Not clouded (◎) |
| State of froth | Good (○) | Good (○) | Good (○) | Good (◎) | Good (○) | Good (○) |
| Intrinsic taste of coffee | Comes into play (○) | Comes into play (○) | Comes into play (○) | Comes into play (○) | Comes into play (○) | Comes into play (○) |
| Mildness and robustness | Good (○) | Good (○) | Good (○) | Good (○) | Good (○) | Good (○) |
| Overall rating | Passing | Passing | Passing | Passing | Passing | Passing |
| The number of times it may reused | 24 | 19 | 14 | 9 | 4 | 24 |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Coffee brewing ratio | | | | | | | | |
| Coffee beans | 10 g | 10 g | 10 g | 10 g | 10 g | 10 g | 10 g | 10 g |
| Hot/cold water | 50 cc | 50 cc | 50 cc | 50 cc | 50 cc | 50 cc | 50 cc | 50 cc |
| The amount of use | 50 cc | 50 cc | 50 cc | 50 cc | 50 cc | 50 cc | 50 cc | 50 cc |
| Composition amount for the frothing liquid base | | | | | | | | |
| Skim-milk powder | 250 g | 250 g | — | — | — | — | — | — |
| Dry whole milk | — | — | 250 g | — | — | — | — | — |
| Powdered formula | — | — | — | 250 g | — | — | — | — |
| Creap | — | — | — | — | 250 g | — | — | — |
| Fresh cream | — | — | — | — | — | 1 pack | — | — |
| Meringue | — | — | — | — | — | — | 1 egg | — |
| Baking soda | — | — | — | — | — | — | — | a few grams |
| Tap water | 1000 cc | 1600 cc | 1100 cc | 1100 cc | 1100 cc | 1100 cc | 1100 cc | 1100 cc |
| The amount of use | 1 heaping teaspoon | 1 heaping teaspoon | 1 heaping teaspoon | 1 heaping teaspoon | 1 heaping teaspoon | 1 heaping teaspoon | 1 heaping teaspoon | A few grams |
| Evaluation results | | | | | | | | |
| Intrinsic color of coffee | Not clouded (◯) | Not clouded (◯) | Clouded (X) | Clouded (X) | Clouded (X) | Clouded (X) | Not clouded (◯) | Not clouded (◯) |
| State of froth | Firm (Δ) | Disappeared (X) | Rather Poor (Δ) | Rather Poor (Δ) | Rather Poor (Δ) | Rather Poor (Δ) | Harden (X) | Disappeared (X) |
| Intrinsic taste of coffee | Comes into play (◯) | Comes into play (◯) | Deteriorated (X) | Deteriorated (X) | Deteriorated (X) | Deteriorated (X) | Deteriorated (X) | Deteriorated (X) |
| Mildness and robustness | Good (◯) | Good (◯) | Good (◯) | Good (◯) | Good (◯) | Good (◯) | Poor (X) | Poor (X) |
| Overall rating | Failure | Failure | Failure | Failure | Failure | Failure | Failure | Failure |

TABLE 3

|  | Manufacturers | Trade names | Remarks |
|---|---|---|---|
| Coffee beans | — | — | Obtained by roasting raw beans |
| Hot/cold water | — | — | Ordinary tap water |
| Skim-milk powder | Snow Brand Foods Co., Ltd. | Skim Milk | — |
| Dry whole milk | Chuo Milk | Dry Whole Milk | — |
| Powdered formula | Wakodo Co., Ltd. | Rebens Milk | — |
| Creap | Morinaga Milk Industry Co. Ltd. | Creap (a registered trademark) | — |
| Fresh cream | Snow Brand Milk Products Co. | Whipped Genuine Vegetable Fat | — |
| Meringue | — | — | In the amount made from albuginea of 1 commercially available egg |
| Baking soda (Sodium hydrogen carbonate) | Takasugi Pharmaceutical Co., Ltd. | Baking Soda | — |
| Coffee maker | Les Cafes Astoria | BRAVR 2GR | Steam pressure of 1 atmosphere, and steam temperature of approximately 100° C. |

EXAMPLES 1 TO 6

Coffee beans prepared by roasting raw beans and grinding them up for appropriate graininess were blended with tap water to brew coffee at a variety of ratios shown in Table 1, and the brewed coffee was poured (in the amount of use) into a demitasse. The brewed coffee takes on a "unturbid dark brown color", and as for its appearance, its surface was covered with fine froth (supernatant froth) of a brown color.

Next, a skim-milk powder was dissolved in tap water to prepare a frothing liquid base at a variety of ratios shown in Table 1, and the liquid base was put into a container. Then, the steam nozzle of a coffee maker (from which steam containing 10 to 30 cc water is released in a single operation) was inserted into the container holding the frothing liquid base, and the switch of the steam nozzle was turned on (with a steam pressure of one atmosphere and a steam temperature of approximately 100 degrees centigrade). The froth liquid base was heated to some 90 degrees centigrade and frothed to form a froth layer on its surface. Once the froth layer had been formed, it was left standing for about two minutes until its froth has come to make almost no change in shape and its form has stabilized.

Finally, one heaping teaspoon of the froth of the froth layer was dipped up, and was mixed with the supernatant froth of the brewed coffee poured into the demitasse.

COMPARATIVE EXAMPLES 1 TO 8

Coffee beans prepared by roasting raw beans and grinding them up for appropriate graininess were blended with tap water to brew coffee at a variety of ratios shown in Table 2, and the brewed coffee was poured (in the amount of use) into a demitasse. The brewed coffee takes on an "unturbid dark brown color", and as for its appearance, its surface was covered with fine froth (supernatant froth) of a brown color.

Next, each of the ingredients to be used in Comparative Examples 1 to 6 (a skim-milk powder, dry whole milk, powdered formula, Creap and fresh cream) was dissolved in tap water to prepare a frothing liquid base at a variety of ratios shown in Table 2, and the liquid base was put into a container. Then, the steam nozzle of the coffee maker (from which steam containing 10 to 30 cc water is released in a single operation) was inserted into the container holding the frothing liquid base, and the switch of the steam nozzle was turned on (with a steam pressure of one atmosphere and a steam temperature of approximately 100 degrees centigrade). The froth liquid base was heated to some 90 degrees centigrade and frothed to form a froth layer on its surface. Once the froth layer had been formed, it was left standing for about two minutes until its froth has come to make almost no change in shape and its form has stabilized. Predetermined amounts of meringue and baking soda were prepared for Comparative Examples 7 and 8, respectively.

Finally, in each of Comparative Examples 1 to 6, one heaping teaspoon of the froth of the froth layer was dipped up, and was mixed with the supernatant froth of the brewed coffee poured into the demitasse. In addition, in Comparative Examples 7 and 8, the predetermined amounts of the meringue and the baking soda were each mixed with the supernatant froth of the brewed coffee.

(Evaluation Test 1)

The coffee beverage samples obtained in the examples and comparative examples as described above were each tested, and their appearances and tastes were evaluated. The criteria for evaluating the appearance consist of the color of coffee and the state of froth, and those for evaluating the taste consist of the taste inherent in coffee, and the mildness and robustness. Among those samples, what was evaluated as being very good or good (marked as ⊚ or ○) on all of the criteria was rated as Passing, and what was evaluated as being poor or very poor (Δ or x) on one or more of the criteria was rated as Failure.

First, the color of the coffee liquid was evaluated as follows. Examples 1 to 6 and Comparative Examples 1, 2, 7 and 8 were all judged as being very good or good (⊚ or ○) since the brewed coffee did not lose its own color without getting whitish. In particular, Examples 1 to 6 produced good results. On the other hand, Comparative Examples 3 to 6 were all judged as being poor or very poor (Δ or x) since the brewed coffee lost its own color and became whitish. The reason may be considered that a cream component derived from milk (component of milk fat) were contained in the dry whole milk, powdered formula, Creap, fresh cream that were used in Comparative Examples 3 to 6, respectively.

Next, as for the texture of froth (the state of froth), Examples 1 to 6 were judged as being very good or good (⊚ or ○) since brown froth was fine-grained and did not disappear even after the brewed coffee was drunk up. In addition, the froth dipped up with a spoon did not drop even if the spoon was turned upside down. In particular, the froth in Example 4 was excellent especially in terms of appearance.

On the other hand, in Comparative Example 1, the amount of water used for conditioning the frothing liquid base was small (i.e. the amount of skim-milk powder was, relatively large). Therefore, the froth was not smooth and it was powdery in terms of appearance. In addition, the froth behaved heavily and unnaturally when it was stirred with the spoon, thereby being judged to be poor (Δ). In addition, in Comparative Example 2, since the amount of water used for conditioning the frothing liquid base was large (i.e. the amount of skim-milk powder was small), the froth was such soft that it disappeared shortly, thereby being judged to be very poor (x). In addition, in any of Comparative Examples 3 to 6, the froth is somewhat coarse-grained, and disappeared when the coffee was drunk up, thereby being judged to be poor (Δ). Further, Comparative Examples 7 and 8 were both judged to be very poor (x); in the former, part of the froth solidified and precipitated out of the brewed coffee, and in the latter, the froth disappeared soon.

Next, as for the taste of coffee, Examples 1 to 6 and Comparative Examples 1 and 2 were judged to be good (○) on both criteria, because the brewed coffee became easy to drink, mild and robust while keeping its intrinsic taste free from a milky smell. Contrarily, in Comparative Examples 3 to 6, mildness and robustness were added, but the taste of cream components became strong, and a milky smell was added, thus ruining the taste inherent in coffee. As a result, those examples were judged to be very poor (x) on the criteria of the taste inherent in coffee, although they were judged to be good (○) on the criteria of the mildness and robustness. In addition, Comparative Examples 7 and 8 were both judged to be very poor (x) on both criteria since the taste inherent in coffee was ruined entirely.

Consequently, Examples 1 to 6, which were judged to be good or very good on all of the evaluation criteria, were all rated as Passing, and Comparative Examples 1 to 8 were all rated as Failure. It should be noted that a comparison between Examples 1 and 6 indicates that a satisfactory coffee beverage may be obtained regardless of whether the concentration of the brewed coffee is on the high or normal side.

(Evaluation Test 2)

Next, Examples 1 to 6 rated as Passing were studied to check the feasibility of reusing the frothing liquid base that had already been used. Specifically, each of the frothing liquid bases of Examples 1 to 6 judged as being good or very good on all of the above-mentioned criteria was stored at low temperatures for four hours after being used. Then, it was heated and frothed again, and the froth of the froth layer thereby obtained was used to produce a coffee beverage by the above-described method. As a result, it was found possible to obtain the frothing base liquid capable of being reused under the above-described method the number of times shown in Table 1 for preparing a coffee beverage, even though the liquid base has been subjected to cold storage, heating and frothing repeatedly.

Based on the number of times the frothing liquid base may be reused and the amount of material for the frothing liquid base, both of which are shown in Table 1, it turned out that the liquid base could be used repeatedly as long as the amount of skim-milk powder to be blended and the total amount of water were within the range shown in Examples 1 to 6 described above.

(Evaluation Test 3)

Similarly, in Examples 1 to 6, the state of the froth after the mixing process was observed. The mixed froth remained in the state of a finely textured cream of a light brown color until the coffee was drunk up, and the froth itself tasted mild and robust. Its appearance was as if the froth absorbed only the color of the brewed coffee to become light brown. In contrast to this, in Comparative Examples 3 to 6, the texture of the froth was somewhat coarse, and the creamy froth did not stay after the last sip, only to disappear in the end.

Several examples of the present invention have been described up to this point, but the present invention is not limited to the above-described examples at all. The brewed coffee used in the foregoing embodiment was relatively strong, but the production method of the present invention may be applied to brewed coffee of various concentrations ranging from relatively weak coffee to strong one. In addition, the present invention is applicable irrespective of how to grind and roast coffee beans and how to brew coffee. Further, the material used for the frothing liquid base is not limited to those shown in Table 3. The blending ratio of the material may be modified variously in accordance with the material to be used.

It should be noted that the history of coffee culture in Japan began after the Second World War, while that in Europe is no less than two hundred years old. However, the present invention can appeal the coffee culture unique to Japan, and also disseminate such a culture originating from Japan to all over the world. The present applicant traveled in many parts of the world to make a comparative study of the coffee culture in Japan and that in Europe, and came to believe that the coffee culture in Japan had attained a high level in spite of historical differences between Europe and Japan.

The present applicant accomplished the method for producing the coffee beverage consistent with the present invention with the aim of establishing the unique coffee culture of Japanese origin. The present applicant is confident that, if this production method is patented and comes into wide use in the United States of America, it may provide a new type of coffee culture.

Thus, the method for producing the coffee beverage consistent with the present invention is very useful industrially, because it may help to increase public attentions to coffee beverages, and also contribute to further prosperity of coffee-related industries.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for producing a coffee beverage, the method comprising:
    a coffee liquid preparation step of brewing coffee or preparing a coffee liquid using cold or hot water and at least one of ground coffee beans, a coffee concentrate and a coffee powder, and pouring the coffee liquid into a container;
    a frothing liquid base preparation step of mixing a skim-milk powder and cold or hot water to obtain a frothing liquid base;
    a frothing step of conducting a frothing process on the frothing liquid base to form a froth layer on a surface of the liquid base; and
    a mixing step of mixing froth of the froth layer with a supernatant liquid or froth of the coffee liquid to make the froth of the froth layer take on a consistent brown color.

2. The method for producing a coffee beverage according to claim 1, wherein the frothing liquid base is obtained by mixing the skim-milk powder and the water at a ratio of 250 g to 1100–1500 cc.

3. The method for producing a coffee beverage according to claim 1, wherein the froth of the froth layer is used after the froth has nearly stopped changing in shape and the form of the froth layer has stabilized, not immediately after the frothing process has been completed.

4. The method for producing a coffee beverage according to claim 1, wherein the cold or hot water used in the coffee liquid preparation step is at 50–100 degrees centigrade, and wherein the frothing process involves heating.

5. The method for producing a coffee beverage according to claim 1, wherein the frothing liquid base is capable of being used repeatedly for the frothing process even after the frothing liquid base has once been served in the frothing process.

6. The method for producing a coffee beverage according to claim 2, wherein the froth of the froth layer is used after the froth has nearly stopped changing in shape and the form of the froth layer has stabilized, not immediately after the frothing process has been completed.

7. The method for producing a coffee beverage according to claim 2, wherein the cold or hot water used in the coffee liquid preparation step is at 50–100 degrees centigrade, and wherein the frothing process involves heating.

8. The method for producing a coffee beverage according to claim 2, wherein the frothing liquid base is capable of being used repeatedly for the frothing process even after the frothing liquid base has once been served in the frothing process.

9. The method for producing a coffee beverage according to claim 3, wherein the cold or hot water used in the coffee liquid preparation step is at 50–100 degrees centigrade, and wherein the frothing process involves heating.

10. The method for producing a coffee beverage according to claim 3, wherein the frothing liquid base is capable of being used repeatedly for the frothing process even after the frothing liquid base has once been served in the frothing process.

11. The method for producing a coffee beverage according to claim 4, wherein the frothing liquid base is capable of being used repeatedly for the frothing process even after the frothing liquid base has once been served in the frothing process.

12. The method for producing a coffee beverage according to claim 6, wherein the cold or hot water used in the coffee liquid preparation step is at 50–100 degrees centigrade, and wherein the frothing process involves heating.

13. The method for producing a coffee beverage according to claim 6, wherein the frothing liquid base is capable of being used repeatedly for the frothing process even after the frothing liquid base has once been served in the frothing process.

14. The method for producing a coffee beverage according to claim 7, wherein the frothing liquid base is capable of being used repeatedly for the frothing process even after the frothing liquid base has once been served in the frothing process.

15. The method for producing a coffee beverage according to claim 9, wherein the frothing liquid base is capable of being used repeatedly for the frothing process even after the frothing liquid base has once been served in the frothing process.

16. The method for producing a coffee beverage according to claim 12, wherein the frothing liquid base is capable of being used repeatedly for the frothing process even after the frothing liquid base has once been served in the frothing process.

* * * * *